April 24, 1945. J. L. KLEINMAN Re. 22,638

RAZOR

Original Filed March 30, 1940 2 Sheets-Sheet 1

Fig. 2. A.

INVENTOR

Jacob L. Kleinman.

April 24, 1945. J. L. KLEINMAN Re. 22,638
RAZOR
Original Filed March 30, 1940 2 Sheets-Sheet 2
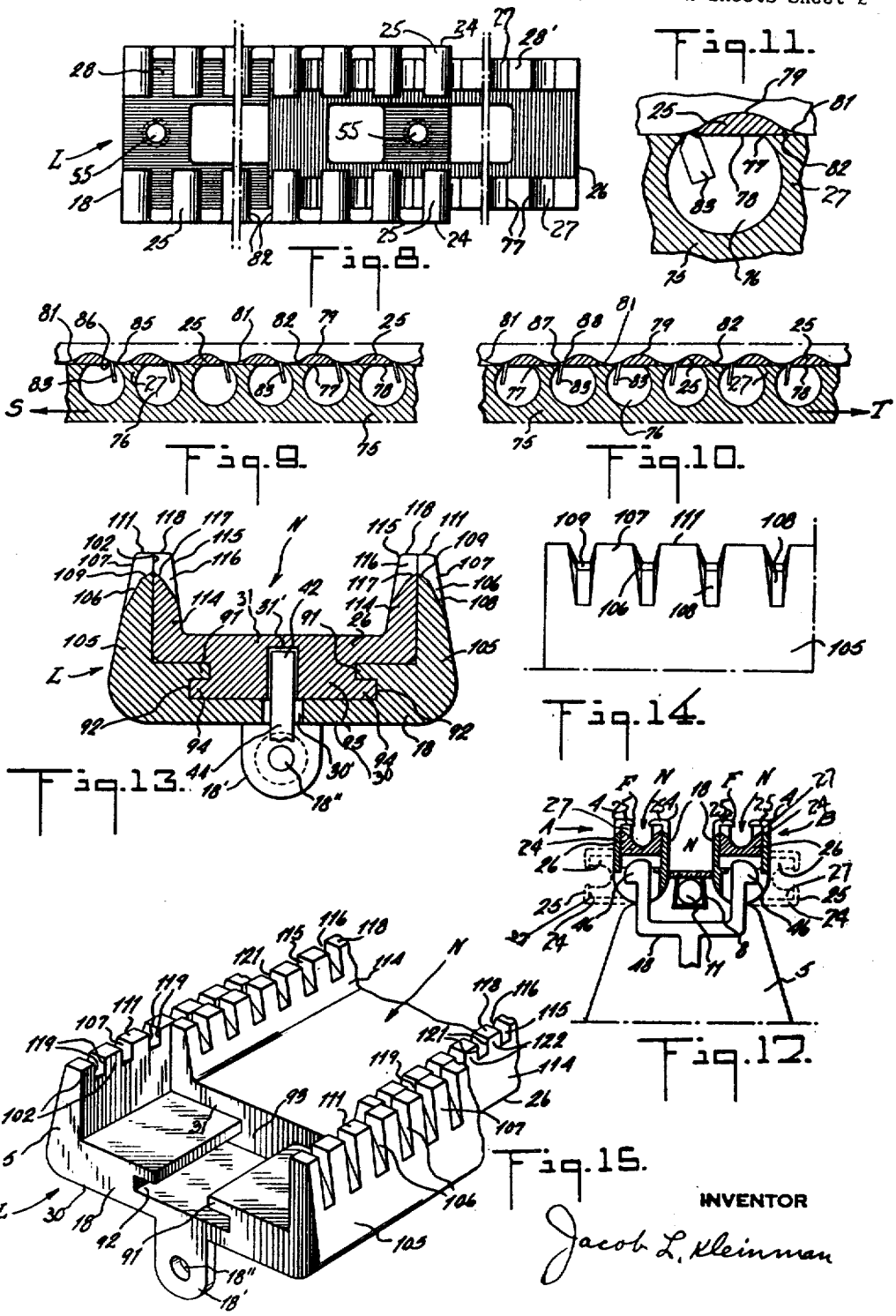
INVENTOR
Jacob L. Kleinman Reissued Apr. 24, 1945

Re. 22,638

UNITED STATES PATENT OFFICE 22,638

RAZOR

Jacob L. Kleinman, New York, N. Y.

Original No. 2,238,813, dated April 15, 1941, Serial No. 326,894, March 30, 1940. Application for reissue August 18, 1944, Serial No. 550,073

53 Claims. (Cl. 30—34)

This invention relates to razors, particularly to dry-shavers, hair cutters or clippers, and more particularly to electric razors or shavers, and is filed as a continuation in part of applicant's copending application S. N. 109,041, filed November 3, 1936, which matured into U. S. Patent No. 2,195,839, issued Apr. 2, 1940.

A primary object of this invention is to provide a device wherein the head portion comprises a plurality of individual hair cutting or shaving units, spaced away from each other in a manner whereby the skin of the face to be shaved may bulge therebetween and the hair may enter the hair passages at the top face of the units and also laterally with respect to such top face of said units thereby increasing the shaving facilities and especially the shaving area of same so that such units may be utilized simultaneously with improved efficiency upon the face for hair cutting or shaving purposes.

A further object of this invention is to provide a device comprising a handle and a hair cutting or shaving unit, wherein the handle contains actuating means for operating said units and wherein the unit may be moved or swung in either direction and be adjusted at any desired position with respect to said handle and be held stationary in such desired position and retain the connection with said actuating means.

Another object of this invention is to provide a device comprising a handle and a hair cutting or shaving unit and illuminating means between the handle and unit for purposes of lighting the portion of the face to be shaved.

Yet a further object of this invention is to provide a device comprising a handle and a plurality of hair cutting or shaving units wherein said units may be adjusted to a position whereby they may be utilized simultaneously upon the face for shaving purposes or be adjusted into opposite directions away from each other and thus be utilized individually upon the face for shaving purposes.

Yet another object of this invention is to provide a hair cutting or shaving device comprising a handle and a plurality of complete, individual cutting units, wherein the actuating means comprises a plurality of sections adapted to engage and operate the reciprocatory sections of such cutting units.

A still further object of this invention is to provide a hair cutting or shaving device comprising a handle and a hair cutting unit consisting of stationary and reciprocatory members, wherein said unit contains adjustable tensioning elements adapted to hold the cutting teeth of the reciprocatory member in frictional contact with the cutting teeth of the stationary member.

Still another object of this invention is to provide a hair cutting or shaving instrument wherein the stationary member of the hair cutting unit may be so shaped or constructed as to facilitate the movement of the instrument upon the skin while cutting the hair.

And yet a very important object of this invention is to provide a hair cutting or shaving unit wherein the reciprocatory member is provided with undercut teeth sections forming sharp cutting edges.

Still a further object of this invention is to provide a hair cutting or shaving device comprising a plurality of skin-engaging faces adapted to be interchangeably applied to the skin of the face to be shaved.

Yet another object of this invention is to provide a hair cutting or shaving device comprising a plurality of shaving units in which each unit has a plurality of shearing faces interchangeably applicable to the skin of the face to be shaved.

Still another object of this invention is to provide a shaving unit having a plurality of shaving surfaces along one of which a guard is interposed between the skin and the shearing surface and along another of which the shearing surfaces contact the skin.

All of the above objects will be seen to be directed toward providing a practical hair cutting or shaving device, wherein the parts are simple in design and easy to construct, and wherein the shaving units are spaced apart or away from each other, having a clear, recessed space between them, permitting the hair to enter the hair passages at the top face of each of the units and also the hair passages at each of the side faces, that is, laterally to the top faces of such units, and, in certain forms of this invention, are arranged in such an exposed manner whereby they may be adjusted to various suitable angular positions with respect to the handle and be held at any desirable or suitable angular position with respect to the face to be shaved and be utilized individually or simultaneously for shaving purposes and be provided with illuminating means; the parts being readily taken apart and cleaned, reassembled or replaced; and in general, a hair cutting or shaving instrument which is practical, useful, simple in construction, easy to operate, economical to manufacture, durable and adaptable for use for various purposes.

Other objects and advantages of the present invention will appear from the description thereof to follow, taken in connection with the accompanying drawings in which:

Fig. 2A is a fragmentary perspective view of the top section of the handle, showing how the illuminating means is held in position.

Figure 1:
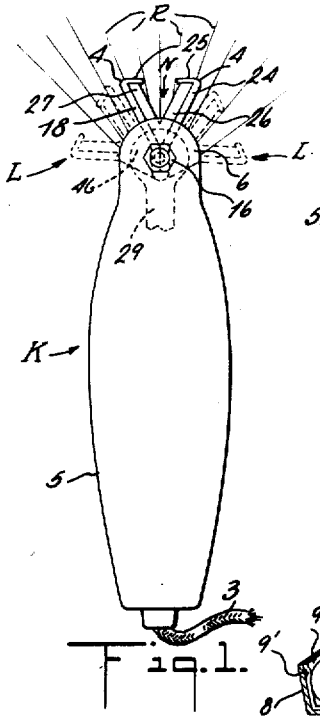
Fig. 1 is a side elevation of one embodiment of the invention, showing an instrument having a top unit which is adjustable at various angular positions with respect to the handle and having a source of illumination positioned below the top unit.
Figure 6:
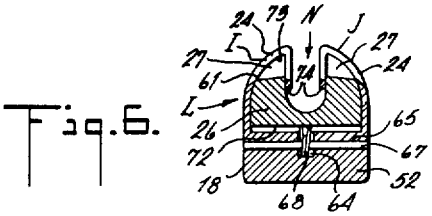
Figure 7:
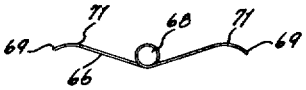

Fig. 6 is a vertical sectional view through another form of top unit in which the end portions of the teeth on the stationary member are connected by a solid portion positioned within the space between the individual shaving units and the hair passages being arranged in such a manner that the hair may enter such hair passages at the top face of each of the units and also at the inner and outer side faces of each of such units laterally with respect to said top faces, and showing also a modified form of tensioning means;

Fig. 7 is a front elevation of the tensioning element of Fig. 6;

Fig. 8 is a plan view, partly disassembled, of the top unit of Fig. 1, showing a modified shape and a modified form of teeth structure, and illustrating one arrangement of light passages in the stationary and movable cutter members and one arrangement of the ball bearing of the tensioning means in the stationary cutter.

Fig. 9 is an enlarged, sectional view through the teeth of the movable member and the overhanging flange portions of the teeth of the stationary member of the top unit shown in Fig. 8, showing greater detail of the undercut teeth structure of such top unit and their cutting action;

Fig. 10 is a view similar to that of Fig. 9, with the movable member positioned in the opposite side to that shown in Fig. 9, showing that both edges of the undercut teeth are adapted to cut the hair;

Fig. 11 is an enlarged view showing, approximately, the manner in which the hair is cut by the edge portions of the upper teeth of the stationary member and by the edge portions of the undercut teeth of the movable or reciprocatory member;

Fig. 17 is a fragmentary, cross-sectional view through a modified form of instrument constructed with two separate top units which are each individually adjustable at various angular positions with respect to the handle and which operate simultaneously at all angles, so that they may be utilized either individually or simultaneously for hair cutting or shaving purposes;

Fig. 13 is a cross-sectional view through another form of top unit having a stationary member without flanges and skin engaging faces of enlarged area and shearing faces disposed at right angles to said skin engaging faces, and hair passages cut transversely from front to rear and having inclined bottom portions and shoulder portions;

Fig. 14 is a side elevation of Fig. 13, showing the slots or hair passages disposed in a manner facilitating the entrance of the hair into the hair passages at each side of each unit laterally with respect to the top face of such unit and Fig. 15 is a detailed, perspective view of Fig. 13.

Referring to the drawings (Figs. 1, 2 and 4), K indicates the assembled instrument wherein the numeral 5 shows a motor-containing handle which may be made of any desirable material (metal or plastic) and may be molded or machined to any suitable style or shape and is connected to a source of power by a cable 3, and L indicates the hair cutting or shaving unit. The top portion of the said handle 5 is provided with extensions 6, and with a recessed section 7. A light reflector, which may be in the form of a box 8, may be positioned within the recessed section 7. Members 9, adapted to receive illuminating means, such as, for example, bulb 11, are positioned within the box 8. Such bulb 11 may be of any suitable style or shape. A transparent element 12 may cover the box 8 and may be held in place by friction fit or by extensions 14 fitting or snapping over the thickened edge sections 15.

Figure 2:
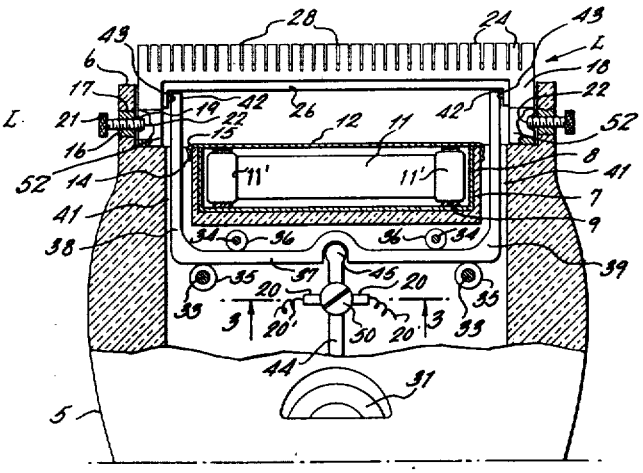
Fig. 2 is a fragmentary, enlarged front elevation, partly in section, of the instrument of Fig. 1, showing the reflecting means, the illuminating means therein, the transparent cover, the actuating element, the means for holding the top unit in position, and also showing the cutting teeth of the top unit and the actuating starter at the handle.
Figure 3:
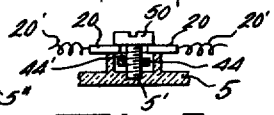
Fig. 3 is a cross-sectional view taken along line 3—3 of Fig. 2, showing an automatic circuit breaker for the actuating mechanism.

In an instrument of the type shown in Fig. 17, the light reflector 8 may be positioned between the units A and B, and the illuminating means or bulb 11 may be held therein in the same manner and for the same purpose as in Fig. 2. Such bulb 11 may be held in position by friction fit within the portions 9′ of elements 9 (Fig. 2A). These elements 9 are suitably insulated, in a manner readily understood and not thought necessary to be shown, and are connected to the motor (not shown), and when the bulb 11 is inserted, the side portions 11′ will contact elements 9 and thus close the circuit. The portions 9′ will prevent displacement of such bulb 11, and when it is required to remove said bulb 11, the user may insert a suitable tool in the opening 5″ of the handle or casing 5, and through an opening in the box 8, the arrangement of which may be readily understood, though not shown in the drawings, and under the bulb 11 and gently move the tool downwardly, thus raising the bulb 11 from its position. To replace the bulb 11, a gentle pressure will snap the bulb in position between the portions 9′ and it will be held in place.

The extensions 6 are provided with non-circular or hexagonal nuts 16, which are held in place within the molded material by means of grooved sections 17. The shaving unit L is positioned between the extensions 6. The stationary member 18 of the said unit L is provided with depressed sections 19. The screw-threaded elements 21 are positioned within the nuts 16 and when they are tightened the end sections of the same will engage and press against the inner flat wall of the recesses 19, as at 22, thus holding the unit L tightly in position. Of course, unit L may be adjusted into any desirable angular position with respect to the handle 5, for example, as indicated by the dotted lines in the drawings, and be held stationary in such adjusted position.

Figure 4:
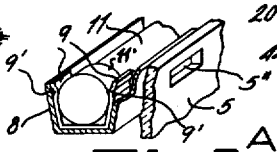
Fig. 4 is a fragmentary sectional view of Fig. 2, showing a modified form of the actuating mechanism.
Figure 4:
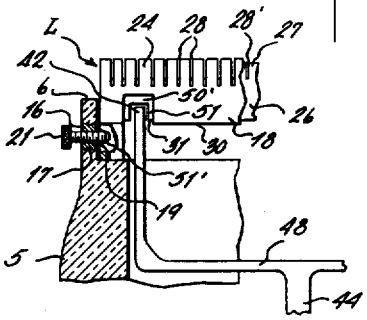

The stationary member 18 is provided with teeth portions 24 and with flange sections 25. A reciprocatory or movable member 26 is slidably supported by the said stationary member 18. The reciprocatory member 26 is provided with the teeth portions 27 (Fig. 4). The upper faces of the teeth portions 27 frictionally engage the underfaces of the flange portions 25 (Fig. 11). The spaces or slots 28, separating the teeth 24, and the spaces or slots 28', separating the teeth 27, act as hair passages, and when, by moving the starter 31, the actuating member 29 is put in motion, the reciprocatory member 26 will be reciprocated, the upper faces of the teeth 27 will move and pass slots 28 of the flange portions 25 and cut hair entering such slots or hair passages. The slots or hair passages 28 and 28' are of suitable length, so as to permit the hair to enter such hair passages also laterally with respect to the top faces or flanges 25 for hair cutting or shaving purposes. The teeth are wider than the width of the hair passages, so that the teeth will not get caught within such hair passages during the operation of the instrument.

The shaving unit L may be flared or shaped cross-sectionally in a manner whereby the base or bottom portion of the same may be of a narrower width than the upper portion thereof, for example, resembling a V shape or any other suitable style or shape, so that such bottom portion will not block the illuminating rays and will permit their passage about the unit to illuminate the section of the face being shaved. If desired, the center portion of the bottom sections 30 of the stationary member 18 and the portion 31 of the reciprocatory member 26 may be removed, as shown in Figs. 2 and 8, so that the illuminating means may also pass through the center section of the hair cutting or shaving unit, thereby providing full illumination from the handle adjacent to each side section of the unit and also through the center portion thereof.

The interior of the handle 5 is provided with the means to hold the mechanism for reciprocating the movable member and also for supplying energy to the illuminating means. A portion of such mechanism is the actuating element. The usual actuating element consists of a single arm adapted to engage the reciprocatory member for reciprocating the same. The mechanism in applicant's structure, however, may comprise a plurality of actuating elements, which may be in the form of a bifurcated structure, adapted to engage a reciprocatory member at a plurality of points, or to engage a plurality of reciprocatory members, for reciprocating purposes; for example, as shown in Figs. 2, 4 and 17. This is accomplished in the following manner: The casing 5 (Fig. 2), is provided with projections 33 and 34, adapted to support rollers 35 and 36. An element 37 is positioned between such rollers 35 and 36. The side portions 38 and 39 of the element 37 protrude through the openings 41, and their upper end sections 42 engage the side faces 43 of the cut out portion of the reciprocatory member 26, so that when the bar 44 is put in motion, the upper section 45 will move the element 37 and the upper end portions 42 of the element 37 will move the reciprocatory member 26, so that the teeth 27 will co-act with the teeth 24 and with the flanges portions 25 for hair cutting or shaving purposes.

If desired, the upper portions 42 of the actuating element may be of enlarged, arcuate outline, such as the fan-shape shown at 46 (see dotted line indications in Fig. 1), in which case the shaving unit L may be swung in any direction and yet retain the connection between the actuating means and the reciprocatory member. The fan-shaped portions 46 may be of separate or individual elements and may be inserted through the top of the opening 41 and secured to the element 37 or sections 38 and 39 by means of solder or friction-fit or other suitable means.

If desired the bar 44 may be made integral with the elements 37, as at 48 (Fig. 4), and the entire element will move as a unit to reciprocate the member 26.

The bar 44 of the actuating means may be provided with an opening 44'. Screw element 50 passes through said opening 44' and is positioned within a screw threaded section 5' of the casing 5. Terminals 20 are secured to the inner section of the casing 5. Electric wires 20' are connected to the terminals 20, and when the screw element 50 is tightened, its head will engage terminals 20 and close the circuit. However, in case the screw 50 should loosen then the circuit will break and the motor will stop working, thus avoiding possible injuries to the user. When the motor is started, the illuminating element 11 will light up and send forth the rays R, but will be extinguished instantly when the operation of the motor is stopped, for which purpose the illuminating element is provided with a suitable connection to the motor for energy supply.

The shaving unit L may be made in various suitable styles, shapes or forms. It is naturally to be understood that the central bottom portions of floor sections 30 of the stationary member 18 and of the floor 31 of the reciprocatory member 26 do not necessarily have to be removed. In such a case the bottom portion may be provided with slots 50' (Fig. 4) and the bottom portion 31 may be provided with slots 51 which are smaller in size than the slots 50', and the upper portions 42 of the actuating means 48 engage within the smaller slots 51 and move freely within the slots 50', thus reciprocating the member 26.

With respect to Fig. 17, it will be seen that the actuating means 48 is in a transverse position with respect to the handle structure and is adapted to operate or reciprocate a plurality of individual shaving units. The end portions 46 of the actuating means 48 may be shaped in half-fan style, or formed in any other suitable manner adapted to retain actuating contact with the reciprocatory member 26 at any angular position of the shaving units with respect to the handle 5.

It may here be noted that the end portion of the screw-element 21 does not necessarily have to engage directly the end wall of the recessed section or opening 19 of the stationary member 18, but that the opening 19 may be tapered or formed in a manner whereby the end section of the screw element 21 may engage the tapered side walls of said opening 19, as at 51' (Fig. 4) and thus hold the L unit in a stationary position.

It is really immaterial in what position the actuating means may be placed with respect to the handle structure, or how it may be constructed, provided the actuating means comprises a plurality of sections arranged in a manner adapted to make a plurality of contacts with the reciprocatory means for reciprocating the latter for operation purposes.

The same is true with respect to the plurality of individual hair cutting or shaving units, as taught by applicant. It does not matter how the cutting units are shaped or arranged, as long as there is a recessed space between the individual cutting units adapted to permit the skin of the face to be shaved to bulge between such units, and the units are provided with shearing elements and hair passages at their top faces and also at their respective side faces so that, while shaving, the hair may enter simultaneously the hair passages at the top face of the leading unit and at the outer side face thereof, laterally to said top face, and also the hair passages at the top face of the trailing unit and at the inner side face thereof, laterally to such top face, thereby providing an enlarged shearing-area contact between the units and the skin to be shaved, thus enabling such units to be utilized with greater effect and improved efficiency for simultaneous use upon the face for shaving purposes, it would naturally come within the spirit of applicant's invention.

For example, Figs. 1, 5, 6, 8, 13 and 15 teach the novelty of having a handle provided with a plurality of individual, complete hair cutting units arranged in a manner providing a recessed or spaced section between such cutting units, and such recessed spaced section is adapted to permit the skin of the face to be shaved to bulge between said units, and the hair passages being arranged in such a manner whereby the hair of the face to be shaved may enter such hair passages at the top faces of the units and also at their respective inner or outer side faces laterally to said top faces simultaneously, so that such units may be utilized simultaneously upon the face for shaving purposes. Fig. 17 also teaches the same novelty, namely, two individual complete shaving units, A and B, spaced apart from each other in a manner permitting the skin of the face to be shaved to bulge therebetween in the space N, and the hair of the face to be shaved entering simultaneonsly the hair passages at the top faces 25 and also the outer hair passages adjacent the arrows A and B and also the inner hair passages adjacent numeral 18, which are laterally disposed with respect to the hair passages at the top faces 25, so that such units may be utilized with greater effect and improved efficiency for simultaneous use upon the face for shaving purposes. It will therefore be seen that the structure as shown in Fig. 17 is within the spirit of the structures as shown in Figs. 1, 5, 6, 8, 13 and 15. It is, therefore, evident that it is immaterial how the individual shaving units are constructed, but that it is the concept of arranging such units, and the performance of same, particularly the practicability of such arrangement, that matters. It will, therefore, be clearly seen that all of the above figures, namely Figs. 1, 5, 6, 8, 17, 13 and 15 are within the spirit and scope of the same invention.

The handle 5 may be built in a manner adapted to hold the shaving units in a fixed stationary position. If desired, however, the handle 5 may be so built as to permit the side or pivotal movement of such units. When such pivoting provision is made in the handle for a device such as shown in Fig. 17, the units A and B may each be swung side-ways to provide the handle 5 with two side hair cutting or shaving devices which are simultaneously operable but which may be separately used and each of which is provided with two individual hair cutting units, so that the user may be able to switch from one device to the other at his convenience.

It will be noticed, of course, that if the two devices, A and B in Fig. 17, are adjusted in an upright, stationary position, the user will be provided with a maximum amount of shaving facilities. Firstly, these devices, A and B, will act as a gauge for holding the handle in proper position against the face for shaving purposes. Secondly, the user will be provided with four (4) individual hair cutting or shaving units, and with eight (8) shearing sections, faces or points, for the reason that applicant has found while experimenting with the structure of the invention that the most cutting of hair takes place at each of the extreme lateral end sections or corners of each face as indicated, for example, by 4 and F, of the upper surfaces of the teeth of the reciprocatory member, in connection with the cutting edges of the overhanging or overlapping teeth or flanges 25, the hair that enter the laterally disposed hair passages being cut by the laterally disposed shearing edges and those entering the hair passages at the upper faces 25 being cut by the extreme end corners 4 or F and cleaned off by the center portion of the faces 25. It will therefore be seen that by providing eight of such shearing corners, and laterally disposed side shearing faces, and top shearing faces, all operable simultaneously, particularly when the devices A and B are both adjusted in upright position on the handle, an enlarged shearing-area is provided for engaging the skin to be shaved, thereby providing a maximum of effectiveness for shaving or hair cutting purposes. It can thus be plainly seen that applicant's invention is a practical and useful structure. The figures herein shown are for illustrative purposes only; and various changes in detail of structure or in the arrangements of parts or of the units may, of course, be resorted to without departing from the spirit and scope of the invention.

Figure 5:
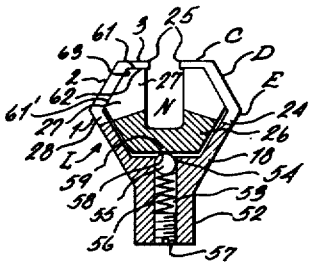
Fig. 5 is a vertical sectional view through a top unit showing the arrangement of the adjustable tensioning means therein, and also that the top unit may be provided with a plurality of skin engaging faces.

It will be seen that each hair cutting unit has a plurality of skin engaging shearing faces, as, for example, 1, 2, 3, and C, D, and E, in Fig. 5, so that the user does not necessarily have to hold the instrument at any certain, particular position with respect to the face to be shaved, and may, while shaving, move the instrument in either direction and hold the same, at his convenience, at various angles to the face and still retain contact between at least one of the shearing faces and the skin of the face to be shaved. The same is true with Fig. 6, wherein the faces 1 and J permit the changing of the position of the instrument with respect to the face to be shaved. The same is true with the structures shown in Figs. 1, 8, 17, 13 and 15. They are all provided with upper skin engaging shearing faces and with side skin engaging shearing faces disposed laterally with respect to said upper shearing faces, such shearing faces may be individually applied to the skin of the face to be shaved.

The letter N indicates the concaved, recessed or spaced sections formed or arranged between the individual shaving units for the purpose of permitting the skin of the face to be shaved to bulge therein, both units when simultaneously applied to the skin, will tense the skin, by means of the bulge, and thereby enable the laterally disposed hair passages on each side of the spaced section to more readily pick up the hair and to present such hair to the laterally disposed shearing elements to cut it more closely to the skin. It will be seen that the edge or end portions 4 and F of the cutting unit L have been formed in a semi-circular, beveled, or curved manner (for example, as shown in Figs. 1 and 17), so that such edge or end portions, when pressed against the face to be shaved, will not injure the skin thereof, but will cause such skin to form bow-waves in front of the moving units, in a manner whereby the hair will be so positioned that they may enter the hair passages laterally with respect to the top faces of such units, and be cut by the side shearing faces adjacent to the end portions 4 or F before actually reaching the immediate shearing sections of the top faces, thus facilitating the shearing operation of the shaving units.

The bottom portions 52 of the stationary member 18 (Fig. 5) is provided with an opening 53 terminating in a restricted opening 54. A ball or bearing 55 is inserted within the opening 53 and is supported therein by suitable resilient means, as for example, the spring 56. The lower portion of the opening 53 is provided with a screw-threaded section adapted to receive a screw-threaded member 57. The member 57 presses against the spring 56 which in turn presses against the ball 55, so that a portion of the ball protrudes out through the restricted opening 54 and engages the underface 58 of the bottom portion 59 of the reciprocatory member 26, thus gently forcing the upper faces 61 and side faces 61' of the teeth 27 of such reciprocatory member 25 to engage the inner faces 62 of the flanges 25 and the inner faces 63 of the side portion of the teeth 28 of the stationary member 18, thus effecting a frictional contact between the teeth of the reciprocatory member and the teeth of the stationary member. Of course, such tension can be controlled by the movement or adjustment of the screw-threaded member 57.

The tensioning device shown in Figs. 6 and 7, has the same object in view and operates in the following manner. The bottom portion 52 of the stationary member 18 is provided with a slot 64 and with an opening 65. Within the said slot 64 is positioned a spring member 66. A pin 67 is placed tightly within the opening 65 and loosely within the opening 68 of the spring element 66. The end sections 69 of the spring element 66 are provided with curved or raised portions 71 adapted to engage the under faces 72 of the reciprocatory member 26, thus gently forcing the upper faces 61 of the teeth 27 to engage frictionally the inner faces 73 of the teeth 24 of the stationary member 18.

It can readily be seen that such tensioning means as herein illustrated and described will facilitate the hair cutting or shaving operation of the instrument. It will also hold the stationary member and the reciprocatory member in a united form, a matter which is of great importance to manufacturer and merchant, as it will minimize the possibility of breakage and misplacement of parts. It will thus be seen that the above is an important feature of the invention.

If desired, the ends of the teeth 24 may be connected by a connecting strip 74 (Fig. 6) which may be positioned either within the concaved outer face N of the reciprocatory member 26, or be arranged in any other suitable manner, thus minimizing the possibility of breakage of the individual teeth 24.

With respect to Figs. 8, 9, 10 and 11, the reciprocatory member 26 is provided with side wall sections 75. These sections are drilled at suitable places, forming holes or openings 76. The top portion above said openings 76 is then removed or milled off until undercut edges 77 are formed, thus providing cutting teeth defined by sides meeting at an acute angle, forming sharp knife edges. The stationary member 18 is also provided with side wall portions and with flanges or overhanging portions 25, in a manner as shown in the other figures, for example, Fig. 1 or 17. The flanges 25 are provided with flat inner faces 78 and with rounded outer faces 79, so that the skin 81, of the face to be shaved may be positioned close to the cutting edges between the slots 28, by reason of the knife edges formed on the flanges 25 by the intersection of their curved and straight or flat sides. (Of course, the figures herein shown are exaggerated and for illustrative purposes, but in actual manufacturing the width of the slots are figured to be of suitable size for the required purposes.) In addition to the above advantage, such a shape will also provide sharp cutting edges 82, so that when the hair 83 enters the slots 28 and 28' it will be cut at the base portion, adjacent to the skin 81, with a scissor-like effect, as shown in Fig. 11, and will not be mashed. Both teeth sections will cut the hair with their sharp edge sections 77 and 82 (Fig. 11). It will be seen that when the reciprocatory member 26 will move in the direction of arrow S, the cutting sections 85 will cooperate with sections 86 in cutting hair 83, and when the reciprocatory member 26 will move towards the direction of arrow T, then the sections 87 will cooperate with the sections 88 in cutting other hair 83. Thus all cutting edges are useful for the within purposes.

It may be noted that the ball bearing tensioning means, as explained above, will also facilitate the movement of the reciprocatory members within the stationary members, by reducing the friction at places other than between the teeth.

It may also be noted that the tensioning means may be located within either the stationary or within the reciprocatory member.

Referring to the devices illustrated in Figs. 13, 14 and 15 of the drawings, the reciprocatory or movable member 26, is provided with an extension 93, adapted to be positioned between the inner sections 91 of the stationary member 18 and with flanges 94 adapted to slide within the slots 92, beneath the undercut sections 91. The floor or bottom portion 30 of member 18 is provided with an opening 30' and the under face of the bottom portion 31 of the member 26 is provided with an opening or recess 31'. An actuating means 44 is positioned through the opening 30' and within the recess 31', as at 42, for reciprocating the member 26. The side sections of the member 18 are provided with loops or ears or extensions 18' which are provided with openings 18'' and are adapted to be secured to the handle 5 in a suitable manner, as for example, by means of screw-threaded elements 21 (Figs. 1 and 2).

The member 18 is provided with side walls 105 which are provided at their upper faces and outer and inner side faces with a plurality of transversely cut grooves or slots 106 forming laterally enterable transverse hair passages of suitable width and length, shaped in a manner to facilitate the entrance of hair laterally into such hair passages. These hair passages 106 are separated by teeth 107 provided with suitable flat areas of a width greater than that of the grooves 106. The floors 108 of the grooves 106 are inclined upwardly and inwardly to terminate in a manner providing shoulders 109, adapted to lift the hair and bend it into position for cutting or shaving purposes. Said shoulders are situated below the upper surface 111 of the teeth 107, thus providing passages for the hair to reach the inner shearing faces 102. The upper surfaces 111 of the teeth 107 are of suitable, extended or appreciable area, flat or otherwise, and constitute a skin engaging means of the device.

The reciprocatory member 26 is provided with the side walls 114 and a concaved or recessed section N, spacing apart the side walls 114 from each other. The side walls 114 are provided with teeth 115, separated by slots or grooves 116 forming laterally enterable transverse hair passages. These grooves or hair passages 116 are positioned laterally with respect to the upper faces of the teeth 115 and are provided with shoulder portions 117 and extend downwardly into the concaved section N, so as to permit the hair to enter from such concaved side section into the laterally disposed hair passages and be affected in the same manner as they are affected by the grooves, slots or hair passages 106 of the teeth of the stationary member 18. The upper sections of the shoulders 117 may meet with the upper sections of the shoulders 109, or such shoulders 117 may be positioned a trifle below said shoulders 109. The upper faces 118 of the teeth 115 may be even with the upper faces 111 of the teeth 107, but preferably positioned a trifle below said faces 111, thus said teeth 115 will not irritate the skin of the face during shaving. The cooperating shearing edges 119 of shearing faces 102 in conjunction with the shearing edges 121 of the shearing faces 122 are positioned in a vertical plane of contact. It will be seen that the cooperating side walls 105 and 114 have common vertical planes of contact disposed substantially normal to the surface to be shaved, and that the recessed section N permits the bulging of the skin adjacent to the shearing teeth, and that in the embodiments of the invention as shown, for example, in Figs. 1, 5, 6, 17 and 13, there are one or more shaving planes which are disposed at an angle, oblique or right, to the plane tangent to the top of the shaving device or perpendicular to the longitudinal axis of the device permitting the cutting of hair laterally of the top of the shaving device, thus facilitating the shearing or shaving operation.

The instruments of the present invention are assembled in the conventional manner. The reciprocatory member is arranged within the stationary member, the adjustable tensioning means arranged in the stationary member, and the top unit thus assembled is then secured in place on the handle which may contain a motor or any other suitable device provided with actuating means which may project through the handle and the bottom of the stationary member to engage the reciprocatory member to move it. It will be noted that the tensioning means are independent of the handle and will, therefore, function in the same manner in all angular positions of the top unit.

It will also be noted that the reciprocatory member comprises a base portion which has a plurality of rows of teeth separated by hair passages formed fully transversely of such member, said teeth rise erectly from the base portion in a manner whereby they are substantially fully and firmly supported on such base portion. Such construction possesses the advantage that it prevents any distortion of both stationary and movable teeth from excess pressure in applying the instrument against the face. The space N between the rows of teeth serves the purpose of permitting the hair to enter laterally into the hair passages 116, from the side of such spaced section N, to be cut by the adjacent teeth and also allowing the cut hair to fall out of such hair passages, to permit fresh hair to enter.

From the above it will be seen that I have invented and perfected a device of new and unique design, a device which is practical, useful and, therefore, of commercial value, and although I have shown certain preferred forms or illustrations in order to explain and describe the novelty of my invention, yet, by showing such structures, I do not, by any means, limit myself to these structures, nor to the terms used in describing the same, as they are for illustrative purposes only. Various suggestions and changes of structure may be resorted to, and I desire it to be understood that I have the same in mind when showing and describing the invention, and seek protection by Letters Patent. And although I have mentioned in describing this invention of what material certain parts may be made, how they may be formed, shaped or styled and how they may be assembled, yet I desire it to be understood that this structure, or parts thereof, may be made of any suitable material, and shaped, formed, grooved or styled in any desirable manner, and assembled in any convenient way so that the parts may be easily taken apart, removed, cleaned, replaced and reassembled, and that various changes in detail may be made without departing from the spirit of this invention.

I claim:

1. A shaving device comprising a handle and a plurality of individual hair cutting units adapted to be used independently of one another, said units comprising stationary and reciprocating members slotted at and through the sides to provide shearing teeth cooperating along planes lying at an angle to the plane tangent to the tops of the units, said units being spaced apart from each other in a manner providing a recessed section between them into which the skin bulges when the units are in use simultaneously, the bulge of the skin causing the hair to stand out from the skin and presenting the hair to the rear cutting unit at an acute angle to the said tangent plane and transversely of the shearing plane between the adjacent cooperating sets of side cutting teeth, the hairs entering through the side slots and intersecting said shearing plane, and means for operating said reciprocating shearing elements.

2. In a shaving device, a shaving head section comprising a plurality of individual laterally-shearing shaving units adapted to be simultaneously operated, said units provided with inner and outer shearing faces and separated by a space arranged to permit the skin of the face being shaved to bulge therein, the said inner and outer shearing faces being disposed laterally with respect to the top face of said units, the teeth of said shearing faces adapted to be engaged in cutting relation along a plane which is at an angle to the plane tangent to the tops of the units.

3. A shaving device comprising a handle and hair shaving means secured to said handle, said hair shaving means comprising a plurality of individual shaving units, each having stationary laterally disposed shearing elements and inner cooperative shearing elements, said units spaced apart sufficiently to permit the skin to bulge therebetween adjacent to said shearing elements, said stationary and movable shearing elements engaging in cutting relation along a plane which is at an angle to the plane tangent to the tops of the units, and actuating means arranged within said handle and extending therefrom to engage the said movable elements for moving the latter in unison and transversely of said handle.

4. A shaving device comprising a handle and hair shaving means secured to said handle, said hair shaving means comprising a plurality of individual spaced apart laterally-shearing cutting units, each of said units comprising cooperating stationary and movable shearing elements, said stationary shearing elements provided with shearing edges disposed laterally with respect to the top face of said units, the movable shearing elements engaging the stationary shearing elements in cutting relation along a plane which is at an angle to the plane tangent to the tops of the units, actuating means arranged within said handle and extending therefrom to engage the said movable elements to move the same in unison and transversely of said handle, and a guard extending at least in part over the movable teeth.

5. In a shaving instrument, a stationary member having slotted sections forming cutting teeth provided with laterally disposed shearing edges and separated by hair passages, a movable member having cutting teeth provided with laterally disposed shearing edges and separated by hair passages, said hair passages extending laterally through the stationary and movable members, the teeth of the movable member engaging the inside faces of the teeth of the stationary member, said device provided with a skin contacting face having a concaved portion permitting the skin of the face to bulge therein, the teeth engaging in cutting relation along a plane which is at an angle to the plane of the skin against which the instrument is applied, the bulge of the skin causing the hair to stand out from the skin and presenting the hair to the cutting teeth laterally through the slots and transversely of the shearing plane and intersecting such plane.

6. In a shaving device, a plurality of individually complete shaving units adapted to be simultaneously operated, said units having shearing faces, each of said shearing faces having cutting edges for cutting substantially transversely of the units and cutting edges for cutting at an angle substantially perpendicular to said transverse cutting edges, said units spaced apart to an extent to permit the skin to be shaved to bulge therebetween, the bulge of the skin causing the hair to stand out from said skin and presenting such hair to the cutting edges laterally through hair passages transversely of the shearing plane and intersecting such plane to effect cutting of said hair by said cutting teeth.

7. In a shaving device, a stationary member having hair passages and cutting edges, a movable member having hair passages and cutting edges, the cutting edges of the movable member engaging the inner faces of the cutting edges of the stationary member, certain of said hair passages being disposed laterally with respect to the top face of the device and the shearing edges adjacent to said hair passages engaging in cutting relation along a plane which is at an angle to the plane of the skin against which the device is applied, said device provided with a skin contacting face having a concaved portion permitting the skin of the face to bulge therein, said bulge causing the hair to stand out from the skin and presenting such hair to the laterally disposed cutting edges through said laterally disposed hair passages transversely of the shearing plane and intersecting such plane to effect cutting of the hair.

8. A shaving device comprising a handle and a plurality of shaving heads, each of said heads including a stationary member and a movable member, said members provided with cutting teeth and hair passages, at least portions of said shaving heads having cutting teeth which are laterally disposed and engage in shearing relation along a plane which is at an angle to a plane perpendicular to the longitudinal axis of the handle, the hair passages defining said laterally disposed teeth arranged to receive the hair on a bulge of the skin immediately in advance of the shaving head when the shaving device is applied against the skin, such hair entering into said laterally disposed hair passages and intersecting the said angularly disposed shearing plane, whereby an enlarged area of shaving contact between the skin and said shaving head is provided as the bulge of the skin wipes against the shaving head.

9. A shaving device comprising a plurality of individual shaving heads, each provided with a top face and laterally disposed side faces, each of said heads including a stationary member and a movable member, said heads spaced apart in a manner permitting the skin of the face to be shaved to bulge therebetween in line with said side faces, said faces provided with shearing edges, at least certain of said shearing edges adapted to cut hair laterally with respect to said top face as the bulge of the skin wipes against the shaving head.

10. A device for hair cutting or shaving purposes comprising a handle and shaving units, said units comprising stationary and reciprocating shearing elements, said stationary element provided with shearing teeth, said teeth provided with flanges inclined towards each other, said reciprocating elements provided with undercut shearing teeth adapted to co-operate with the shearing edges of the teeth and of the flanges of said stationary elements, said elements provided with open floors, each of said units provided with a plurality of skin-engaging shearing faces, said handle provided with actuating sections adapted to engage said reciprocating elements for operating purposes, said units provided with adjustable tensioning means, said handle provided with illuminating means arranged below said open floors in position to shine through said open floors and also adjacent to the outer side faces of said units, said units adapted to be adjusted at various positions with respect to the handle, means for holding said units in adjusted position and means for facilitating the movements of said device upon the skin for operating purposes.

11. A device for hair cutting or shaving purposes comprising a handle and a shaving unit, said unit comprising a stationary shearing member and a reciprocatory shearing member and illuminating means between said handle and said unit, said unit provided with means permitting the light from said illuminating means to shine adjacent the shearing sections of the unit.

12. A device for hair cutting or shaving purposes including a handle and hair cutting means, said means comprising stationary shearing elements and reciprocating shearing elements, a screw threaded member carried by said handle pivotally securing said means thereto, said screw threaded member adapted to hold said means on said handle in adjustably fixed position.

13. In a device for hair cutting or shaving purposes, a shearing unit comprising a stationary member and a reciprocatory member, adjustable tensioning means arranged within said unit, said means adapted to cause frictional engagement between the shearing sections of the reciprocatory member and the shearing sections of the stationary member for operating purposes.

14. A shaving device for hair cutting or the like comprising a top-unit, said top-unit comprising a stationary member and a reciprocatory member, said stationary member comprising a base portion and two spaced apart side walls, the upper section of each side wall terminating in a flange directed towards the other side wall, said reciprocatory member comprising a base portion and two spaced apart side walls, said flanges provided with shearing teeth separated by hair passages, said side walls of the reciprocatory member provided with laterally disposed slots forming individual erect shearing teeth separated by hair passages, the upper faces of said erect shearing teeth adapted to contact the under faces of the shearing teeth of said flanges whereby the cutting edges of said teeth may meet in direct frictional engagement with each other for hair cutting purposes.

15. A shaving device for hair cutting or the like comprising a handle and a top-unit, said top-unit comprising a stationary member and a movable member, said stationary member comprising a base portion and two spaced apart side walls, said side walls provided with teeth sections positioned between them, said teeth sections separated by laterally disposed slots forming hair passages, said movable member comprising a base portion and spaced apart side walls, said side walls of said movable member provided with individual erect shearing teeth separated by laterally disposed slots forming hair passages, said handle containing actuating means for operating said movable member, the upper faces of said erect shearing teeth adapted to engage directly the under faces of said teeth sections in a manner whereby the cutting edges of said teeth may meet in frictional engagement with each other for hair cutting or shaving purposes.

16. A shaving device for hair cutting or the like comprising a handle and a top-unit, said top-unit comprising a stationary member and a reciprocatory member, said stationary member comprising a base portion and spaced apart side walls and teeth sections forming portions of a roof between said side walls, said reciprocatory member provided with undercut teeth portions adapted to frictionally engage the under faces of said teeth sections for hair cutting purposes.

17. A shaving device for hair cutting or shaving purposes comprising a handle and a top-unit, said top-unit comprising a stationary member adapted to be secured to said handle and a reciprocatory member adapted to be supported by said stationary member, said stationary member comprising transverse guard faces grooved to present hair passages of suitable depth and contact faces disposed substantially at right angles thereto, said reciprocatory member comprising corresponding contact faces and shearing teeth separated by hair passages and a clear recessed outer face permitting the skin of the face to be shaved to bulge therein, and means for operating said reciprocatory member.

18. In a shaving instrument, a handle, a top unit connected to the handle, illuminating means mounted between said handle and said top unit, said top unit being tapered downwardly toward said illuminating means to permit light from said illuminating means to pass along one or both of the tapering sides of said top unit.

19. In a hair cutting device, a top unit comprising a stationary member and a movable member, said members shaped to form a plurality of shearing units, each of said shearing units having a plurality of skin engaging plane shearing faces at an angle to and continuous with one another, whereby said device may be applied to the face at any one of various angles and yet be maintained in operative contact with the face.

20. In a hair cutting device, a top unit having a plurality of hair cutting units, each of said units having a plurality of shearing faces at an angle to and adjoining one another and adapted to be applied to the face at any one of various angles, whereby said device may be maintained in operative contact with the face.

21. In a hair cutting or shaving device, a stationary member comprising two spaced apart side walls and a bottom portion between them, said side walls provided with undercut shearing teeth separated by laterally disposed slots forming hair passages, and a movable member comprising two spaced apart rows of individual erect shearing teeth, said teeth separated from each other by laterally disposed slots forming hair passages and adapted to cooperate with the undercut teeth of the said stationary member.

22. In a shaving device, a movable cutter member comprising a base portion and a plurality of spaced rows of individual erect shearing teeth rising from said base portion, said teeth separated from each other by laterally disposed slots forming hair passages, each of said teeth having a plurality of faces provided with shearing edges, the shearing edges of each of the several faces of a tooth being disposed at an angle.

23. In a shaving device, a movable cutter member comprising a base portion and a plurality of individual solid erect cutting teeth extending from said base portion and separated from each other by laterally disposed slots forming hair passages, each of said cutting teeth having a plurality of parallel shearing edges on its free end.

24. In a shaving device, a movable cutter member comprising a base portion and a plurality of individual erect cutting teeth rising from said base portion and separated from each other by laterally disposed slots forming hair passages, each of said teeth having a plurality of parallel shearing edges on its free end and a shearing edge disposed laterally with respect to said free end.

25. In a shaving device, an inner movable cutter member comprising a base portion and a plurality of spaced rows of individual erect shearing teeth extending from said base portion, said teeth separated from each other by laterally disposed slots forming hair passages, an outer stationary cutting member comprising a base portion and side walls provided with flanges, said side walls positioned alongside the teeth of the movable cutter member, each of said side walls and flanges provided with shearing sections separated from each other by laterally disposed slots forming hair passages, portions of said shearing sections overhanging and frictionally engaging said erect shearing teeth.

26. In a shaving device, a movable cutter member comprising a base portion and a plurality of spaced rows of individual erect cutting teeth extending from said base portion, said teeth separated from each other by laterally disposed slots forming hair passages, each of said cutting teeth having a shearing edge on its top face and a shearing edge disposed laterally with respect to said top face, a stationary member comprising a base portion and side walls, said base portion adapted to be positioned underneath the base portion of the movable member and the side walls extending one alongside each of said rows of teeth of such movable cutter member, a flange extending from each of said walls and overlying the adjoining row of teeth of the said movable cutter member, said walls and flanges having laterally disposed slots forming teeth and hair passages, said teeth provided with shearing edges adapted to cooperate with the shearing edges of the teeth of the movable cutter member.

27. In a shaving device, a movable cutter member comprising a base portion and a plurality of spaced rows of individual erect cutting teeth extending from said base portion, said teeth separated from each other by laterally disposed slots forming hair passages, each of said erect cutting teeth having a plurality of angularly disposed shearing edges, and a stationary member comprising a base portion and two side rows of cutting teeth, said teeth separated from each other by laterally disposed hair passages and provided with shearing edges adapted to cooperate with the respective shearing edges of a cutting tooth of the movable cutter member.

28. In a shearing device, a movable cutter member comprising a base portion and a plurality of rows of individual erect cutting teeth, said teeth separated from each other by laterally disposed slots forming hair passages and provided with shearing edges, said rows of cutting teeth separated by a recess between them, a stationary member having a base portion and spaced side walls and cutting teeth between said side walls, said teeth of said stationary member separated by laterally disposed hair passages and having shearing edges adapted to cooperate with the shearing edges of the corresponding cutting teeth of the said movable member.

29. In a shaving device, a movable cutter member comprising a plurality of spaced rows of individual erect cutting teeth and a base portion between said rows of teeth, said cutting teeth separated from each other by laterally disposed slots forming hair passages and provided with shearing edges, and a stationary member, said stationary member provided with spaced side walls and a base portion between them, a roof between said side walls of said stationary member, said roof and portions of said side walls being slotted to form cutting teeth and hair passages disposed laterally with respect to said roof, said teeth provided with cutting edges adapted to cooperate with the cutting edges of the cutting teeth of the movable cutter member.

30. In a hair cutting or shaving device, a movable member provided with cutting teeth each having a free end face and a concaved side wall, the said end faces and the said concaved side walls intersecting to form sharp cutting edges.

31. In a hair cutting or shaving device, a cutting member provided with cutting teeth, said teeth each having a free end face and side walls, the end face and a side wall of each of said teeth intersecting at an acute angle to form a sharp cutting edge.

32. In a hair cutting or shaving device, a movable member having cutting teeth, said teeth each having a free end face and side walls, said end face and a side wall of each of said teeth intersecting at an acute angle, to form a sharp cutting edge, and a stationary member having flange teeth overhanging the free end faces of the teeth of the said movable member, said flange faces having cutting edges adapted to cooperate with the cutting edges of the teeth of said movable member.

33. In a hair cutting or shaving device, a movable cutting member having cutting teeth arranged in a row and separated by hair passages, said teeth having free ends and facing side walls, an end face of each of said teeth and a side wall thereof intersecting at an acute angle to form a sharp cutting edge, and a stationary member having flange teeth overhanging the free ends of the teeth of the movable member, said flange teeth each having cutting edges defined by two planes intersecting at an acute angle and adapted to cooperate with cutting edges of the teeth of the movable member.

34. A hair cutting or shaving device comprising a handle and a top unit, said top unit comprising a stationary member adapted to be secured to said handle and a reciprocatory member adapted to be supported by said stationary member, said stationary member comprising transverse guard teeth separated by hair passages, and said reciprocatory member comprising corresponding teeth separated by hair passages increasing inwardly in width.

35. A hair cutting or shaving device comprising a handle and a top unit adapted to be secured to said handle, said top unit comprising spaced hair cutting units having a light passage between them adapted to permit light to pass through the space between said units from the bottom towards the top of said units, and illuminating means carried by said device, in line with said light passage to send rays of light therethrough.

36. A hair cutting or shaving device comprising a handle and a top unit adapted to be secured to said handle, said top unit comprising spaced hair cutting units and illuminating means arranged between said units whereby the skin of the face being shaved will be illuminated.

37. In a hair cutting or shaving device, a handle and a top unit, said top unit having a plurality of spaced apart hair cutting units, said hair cutting units being pivotally connected to the handle in a manner permitting the angular adjustment of said units with respect to said handle independently of one another and in opposite directions from one another, and means for fixing said units in adjusted position.

38. A handle for a shaving or hair cutting device comprising a housing adapted to be grasped by the hand, a recess in one end of the housing formed to permit the seating of a cutting unit in adjustable angular position relative to the handle, a screw threaded member passing through said housing securing said cutting unit and fixedly retaining the same in adjusted position, an operating mechanism arranged within the housing, one or more actuating sections operably connected to the said operating mechanism and projecting into the said recess to engage one or more cutting units arranged therein, said actuating sections operatively engaging said one or more cutting units at all angles of said cutting unit or units to the handle.

39. A shaving instrument comprising a plurality of individual shaving units provided with laterally disposed shearing edges, said units having a clear space between them to permit the skin to bulge adjacent to said shearing edges, said units comprising cooperating stationary and reciprocatory members, said members of at least one of said units provided with flat shearing teeth.

40. A shaving instrument comprising a plurality of individual shaving units provided with laterally disposed shearing edges, said units spaced apart to permit the skin to bulge therebetween adjacent to said shearing edges, one of said units comprising a movable member having flat shearing teeth with a shearing face on their free ends and a stationary member having teeth overhanging and cooperating with the free end faces of the teeth of the movable member for hair cutting purposes.

41. A hair cutting device comprising, in combination, an operating handle and a hair cutting unit, said unit having a skin contacting face and a base portion, said base portion being connected to the operating handle, and side walls tapering from the said skin contacting face to the said base portion, and illuminating means mounted on the device intermediate said operating handle and said hair cutting unit, in position to direct rays of light along the tapering side walls of the hair cutting unit.

42. In a hair cutting or shaving device, a movable cutter member having cutting teeth, each of said teeth having at least one end face and at least one side face, at least one side portion of said end face and its adjacent side face forming an acute angled cutting edge.

43. In a shaving device, a plurality of individual complete hair cutting units each including a stationary and a movable member, each of said units having shearing means defined by openings formed through the walls of such unit laterally with respect to the top face thereof and engaging in cutting relation along a plane which is at an angle to the plane tangent to said top face of the unit, said units spaced apart to permit the skin of the face to be shaved to bulge therebetween adjacent to said shearing means, the shearing means of one of said units adapted to engage the skin to be shaved simultaneously with the shearing means of the other unit and also adapted to be individually disposed against said skin.

44. A shaving instrument having a skin contacting shearing face provided with a bordering laterally disposed shearing face leading to a central portion at a lower level than said contacting shearing face, the hair passages and shearing edges of said shearing faces arranged in a manner whereby when the skin of the face to be shaved is pressed against said central portion it will contact an enlarged shearing area of the instrument so that the hair may enter the hair passages and be cut by a cooperating shearing element laterally with respect to said skin contacting face, thereby facilitating hair cutting by the immediate shearing portions of the instrument.

45. A shaving instrument comprising a handle and a plurality of individual shaving units, said units provided with top faces and with side faces and spaced apart in a manner whereby the skin of the face to be shaved may bulge between said side faces, said faces provided with shearing elements so arranged that when the instrument is moved upon the skin the outer side face of the leading unit and the inner side face of the trailing unit will simultaneously engage the skin and effect shaving thereof, thus rendering a quicker and cleaner shave.

46. In a shaving instrument, a cutter head comprising a stationary member having hair passages certain of which are disposed in a manner forming laterally disposed shearing elements and an inner cooperating shearing member, said head presenting a skin contacting face and an intermediate central portion at a lower level than said face and defined in part by a side wall section leading to said skin contacting face, certain of said hair passages being disposed in the said side wall so as to be entered laterally by the hair of the skin overlying said central portion and to be cut by the shearing elements of said side wall.

47. A shaving instrument comprising a handle and a plurality of shaving units, each of said units provided with a sloping side wall having shearing means, the side wall of one of said units facing the side wall of the other of said units and disposed in a manner providing a spaced section between such units, said spaced section adapted to receive a bulge of the skin to be shaved and effect shaving thereof by the shearing means of said side walls.

48. A shaving device comprising a plurality of shaving units each provided with a curved shearing face, said units spaced away from each other in a manner whereby a portion of the skin of the face to be shaved may project therebetween in line with said shearing faces, said faces provided with shearing edges and hair passages disposed laterally with respect to the top face thereof whereby hair of the skin wiping against said shearing faces is caused to enter such hair passages at an oblique angle to a plane perpendicular to the longitudinal axis of the device, a movable member reciprocable within the stationary member in shearing relation with the inner surface of said stationary member and operative to cut the hair projecting through said hair passages.

49. A shaving instrument having a skin contacting face, said face provided with a recessed portion being defined in part by a laterally disposed wall section leading to said skin contacting face and adapted to receive a bulge of the skin to be shaved when the instrument is pressed to such skin, said skin contacting face and said wall section provided with hair passages forming shearing elements and with an inner cooperating shearing member, said hair passages arranged to be entered by the hair simultaneously at the skin contacting face and also at the said wall section laterally with respect to such face, thereby forming an enlarged skin contacting shearing area.

50. A device for hair cutting or shaving purposes comprising a handle and a shearing unit and illuminating means between said handle and said unit, said unit including a stationary shearing member and a cooperative shearing member, a transparent element covering said illuminating means in a manner permitting the light to shine through said element, said unit provided with means permitting the light from said illuminating means to shine adjacent the shearing sections of the unit.

51. A device for hair cutting or shaving purposes comprising a handle and a shearing unit and illuminating means between said handle and said unit, said unit including a stationary shearing member and a reciprocatory shearing member, the said handle provided with means adapted to support the said illuminating means, and a transparent element supported by said handle covering said illuminating means in a manner permitting the light to shine through said transparent element, said unit provided with means permitting the light from said illuminating means to shine adjacent the shearing section of the unit.

52. A device for hair cutting or shaving purposes comprising a handle and a shaving unit having illuminating means and a light reflector between said handle and said unit, said unit including a stationary shearing element and a cooperating shearing element, said reflector adapted to direct rays of light from said illuminating means to the face to be shaved in a manner brightening the skin of said face adjacent to the shearing elements of said device thereby facilitating the shaving operation of such device.

53. A device for hair cutting or shaving purposes comprising a handle and a shaving unit, illuminating means between said handle and said unit, a transparent element covering said illuminating means, and a reflector positioned adjacent to said illuminating means for the purpose of reflecting light from such illuminating means to the face to be shaved thereby brightening the shaving area of said face adjacent to the shearing sections of said shaving unit.

JACOB L. KLEINMAN.

Disclaimer

Re. 22,638.— *Jacob L. Kleinman*, New York, N. Y. RAZOR. Patent dated Apr. 24, 1945. Disclaimer filed May 16, 1951, by the inventor.

Hereby enters this disclaimer to claims 4 and 8 of said patent.

[*Official Gazette June 19, 1951.*]